United States Patent [19]

Kuperman

[11] Patent Number: 4,653,909

[45] Date of Patent: Mar. 31, 1987

[54] SINUSOIDAL DETERMINATION OF LIMITING OPTICAL RESOLUTION

[75] Inventor: Gilbert G. Kuperman, Dayton, Ohio

[73] Assignee: The United States of America as represented by the Secretary of the Air Force, Washington, D.C.

[21] Appl. No.: 793,812

[22] Filed: Nov. 1, 1985

[51] Int. Cl.[4] .................................. G01M 11/02
[52] U.S. Cl. .................................. 356/124.5; 356/239
[58] Field of Search .................... 356/124, 124.5, 239; 250/237 G

[56] References Cited

U.S. PATENT DOCUMENTS

| | | | |
|---|---|---|---|
| 3,977,795 | 8/1976 | Buschmann | 356/256 |
| 4,060,328 | 11/1977 | Flynt | 356/124 |
| 4,241,996 | 12/1980 | Weiser | 356/124.5 |
| 4,274,737 | 6/1981 | Howland | 356/124.5 |
| 4,582,427 | 4/1986 | Hutchin | 356/124.5 |
| 4,586,817 | 5/1986 | Ehemann, Jr. | 356/124.5 |

OTHER PUBLICATIONS

J. C. Dainty and R. Shaw, *Image Science*, Academic Press, NY, NY (1974).

C. Rodriguez-Torres and R. B. Summers, "Photographic Emulsion Threshold Functions Study", AFAL-TR-76-19, Mar. 1976.

M. A. Berkovitz, "Determining Resolution of Photo-Optical Systems", Image Technology, Feb./Mar. 1969.

G. C. Brock, "The Physical Aspects of Aerial Photography", Dover Publications, NY, NY, 1967.

G. C. Brock, "Reflections on 30 Years of Image Evaluation", *Photographic Science and Engineering*, vol. 2, No. 5, 1967.

E. L. Gliatti, "Modulation Transfer Analysis of Aerial Imagery", *Photogrammetria*, vol. 33, 1977.

R. Burke, W. Marshall and J. Kean, "Photographic Systems Performance Analysis Using Double-Annulus Targets", AFAL-TR-74-218, Sep. 1974.

Gilbert G. Kuperman, "Investigation of Photographic Image Quality Estimators", AFAMRL-TR-80-27, Apr. 1980.

Primary Examiner—Eugene R. LaRoche
Assistant Examiner—Steven J. Mottola
Attorney, Agent, or Firm—Gerald B. Hollins; Donald J. Singer

[57] ABSTRACT

An optical system limiting resolution determination arrangement employing sinusoidal intensity modulated bar pattern input stimuli including two sequences for determining the modulation transfer function (MTF) component of limiting resolution; one of these and the disclosed aerial image modulation (AIM) curve determination are based on sinusoidal intensity modulated bar patterns, while the other MTF determination uses a Heaviside edge function stimulus and a sinusoidally determined AIM curve. The disclosed limiting resolution is especially useful in the consideration of aerial image devices such as cameras.

15 Claims, 4 Drawing Figures

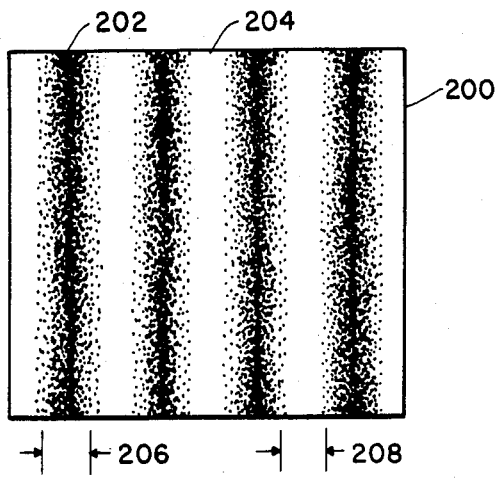
Fig. 2
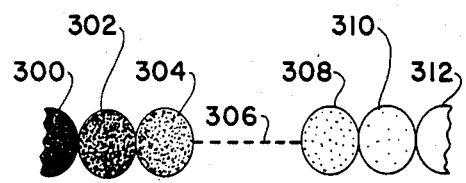
Fig. 3
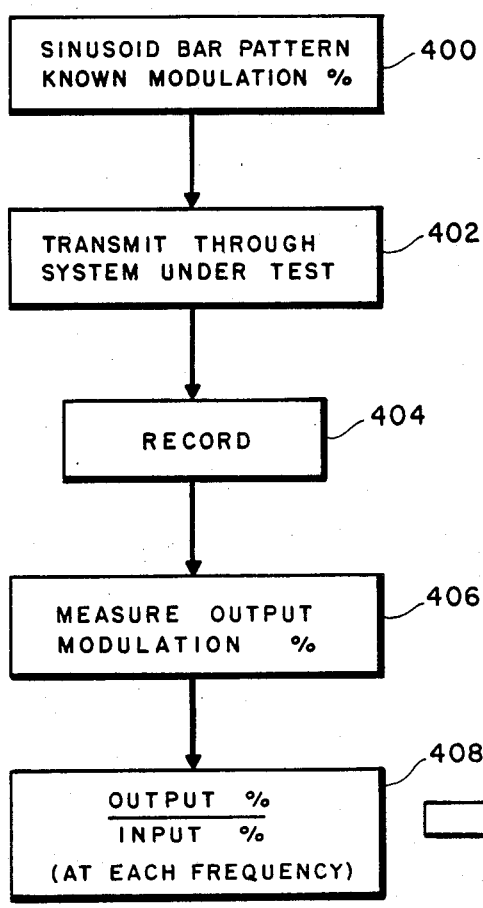
Fig. 4
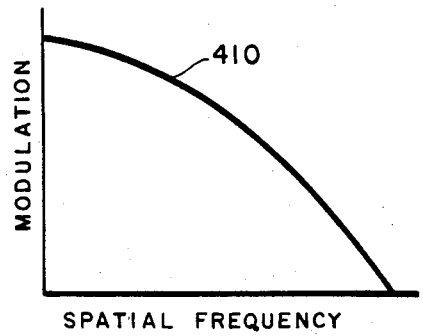

SINUSOIDAL DETERMINATION OF LIMITING OPTICAL RESOLUTION

RIGHTS OF THE GOVERNMENT

The invention described herein may be manufactured and used by or for the Government of the United States for all governmental purposes without the payment of any royalty.

BACKGROUND OF THE INVENTION

This invention relates to the field of measuring overall image resolution capability in optical and retina systems such as a camera and its film and processing.

The precise definition and measurement of image resolving capability is of material importance in the highly demanding optical arts as aerial and space photography, microphotography, and night vision image enhancement. In such arts the ability to satisfactorily reproduce an image is often limited by both the ultimate capabilities of the optical components such as lenses and prisms and by the retina media involved. Military reconnaissance and mapping operations in particular usually require the best resolved imaging obtainable in the optical art in order that small objects in a large area photograph appear well defined even during highly magnified examination.

In view of the constant evolution and improvement occurring in the optical art, it is also desirable for optical system characterization purposes to have accurate and as much as possible, objective arrangements for measuring the resolution ability of a particular optical system—both the optical components of a system and the combination of particular optical components with prospective retina or, for example, photographic films. As suggested by author G.C. Brock in the technical article incorporated by reference below, the ability to relate a particular optical system to a given set of parameters is useful in both the technical characterization of, for example, new optical systems and in the identifying of desired performance levels in a vendor-purchaser setting.

Several arrangements for evaluating resolution performance of an optical system are known in the optics art. One of these arrangements, the combination of the objectively determined modulation transfer function (MTF) and the aerial image modulation (AIM) curves is particularly attractive for optical system resolution evaluation because of the variety of arrangements by which the MTF can be evaluated, and because of the mathematical utility of evaluating synthesized optical systems from the cascaded MTFs of the component parts—even including expected optical disturbance factors.

The mathematic basis for the MTF is known in the art and is, for example, discussed in the textbook *Image Science* authored by J. C. Dainty and R. Shaw and published in 1974 by Academic Press Incorporated of New York, NY; the disclosure of the Dainty and Shaw text is hereby incorporated by reference into the present specification. The MTF for a particular optical component can, in fact, be estimated by several different arrangements, including its Heaviside edge function response, with sinusoidal pattern based evaluation arrangements and by the arrangements disclosed in prior patents identified below herein. A Heaviside MTF estimation is generally based on the spatial frequency content of an optical edge image and is mathematically describable by the quotient of sine wave output modulation divided by sine wave input modulation.

The MTF, once determined, is actually an operator function which can be applied to spatial frequency spectra to predict an overall optical system's response. The MTF is, of course, most useful where information of known and limited spectra is being processed and therefore requires that most real-life scenes be simplified or approximated as to spectral content for its theoretically proper use.

A threshold function such as the Aerial Image Modulation (AIM) curve, otherwise known as a demand curve, or modulation detectability curve is, on the other hand, a measure of human ability to resolve pattern information. Generally, a determination of the AIM curve involves optical image disturbances occurring at low image contrast and varying image pattern frequency. The AIM curve is generally considered to be the threshold of resolving power measured at the 50% resolution level for the combination of an optical system, film, and film processing. Laboratory procedures for generating AIM curve threshold data are described, for example, in the publication "Photographic Emulsion Threshold Functions Study" (AFAL-TR-76-19), drafted by C. Rodriguez-Torres and R. B. Summers in March 1976 and based on work performed at the Air Force Avionics Laboratory, Wright-Patterson AFB, Ohio. The Rodriguez-Torres and Summers publication is hereby incorporated by reference into the present specification.

The combination of MTF and AIM curves has been shown to be a reliable and accurate method for predicting the resolution of a photo-optical system and predictions based on the combination of these curves have been shown to closely correlate with estimates of the previously used concept of resolving power. Such results are reported in the article "Determining Resolution of Photo-Optical Systems", written by M. A. Berkovitz, and appearing in the February/March 1969 issue of the publication *Image Technology*. The disclosure of the Berkovitz Image Technology article is also hereby incorporated by reference into the present specification.

The use of a combination of MTF and AIM characterizations in determining the limiting resolving power for a military reconnaissance system is described in the two publications "The Physical Aspects of Aerial Photography", written by G. C. Brock and published by Dover Publications, Inc. of New York, NY in 1967, and also in the technical article "Reflections on 30 Years of Image Evaluation", written by G. C. Brock in 1967 and published in Vol. 2, No. 5 of *Photographic Science and Engineering*. Both of these 1967 Brock publications are also hereby incorporated by reference into the present specification. In these publications the working convenience and also the theoretical weakness attending the common practice of converting MTF information into resolving power figures is discussed. The undesirable tendency of most commonly used test patterns to weight their characterization heavily in a limited spectral portion of the MTF is also discussed in these publications. Generally speaking therefore, MTF is in itself a more theoretically desirable measure of optical component performance than is resolving power, even though it is more cumbersome to use, especially in performance evaluation work. and is actually most applicable to sinusoidal input images. This desirability of sinusoidal images in determining the MTF curve of an optical system in combination with the common practice of employing square wave or high contrast bar patterns in determining the AIM curve is a point of doubtful theoretical substantiation in optical practice and is addressed by the capabilities of the present invention.

With respect to the determination of MTF through the approach of sinusoidal intensity images, it should be recognized that use of a Heaviside function image, an image comprised of a light to dark edge transition tends to be a determination of MTF by sinusoidal intensity modulated images. The Fourier series components used to describe a Heaviside edge function mathematically and into which an optical lens tends to decompose the Heaviside edge function are, of course, sinusoidal in nature.

Procedures for achieving MTF/AIM image analysis are also described in the publications "Modulation Transfer Analysis of Aerial Imagery" by E. L. Gliatti, published in Photogrammetria, Vol. 33, 1977, and in an article appearing in the Proceedings of the Society of Photo-optical Instrumentation Engineers, Vol. 137, and originating in the 28-29 March 1978 Washington, D.C. conference Airborne Reconnaissance, III", also authored by E. L. Gliatti. Such procedures are also discussed in the Berkovitz article referred to previously. The disclosure of the two Gliatti articles is also hereby incorporated by reference into the present specification.

Another optical analysis procedure is documented in the technical report AFAL-TR-74-218, titled "Photographic Systems Performance Analysis using Double-Annulus Targets" authored by R. Burke, W. Marshall and J. Kean and published by the Air Force Avionics Laboratory, Wright-Patterson AFB, Ohio in September 1974. The contents of the TR-74-218 report are also hereby incorporated by reference into the present specification.

A discussion of image quality estimators and also their capability for describing certain types of degradation often found in aerial photographs, e.g., relative motion of the photosensitive media and the image being photographed, is contained in a technical report titled "Investigation of Photographic Image Quality Estimators", authored by the inventor hereof, and dated April 1980. This report was prepared for the Air Force Aerospace Medical Research Laboratory, Aerospace Medical Division, Air Force Systems Command, Wright-Patterson AFB, Ohio, 45433, and is available from the National Technical Information Service at 5285 Port Royal Road, Springfield, VA 22161, under the designation of AFAMRL-TR-80-27. The image quality estimators report includes several pages of discussion and description concerning subjective image quality estimators and objective image quality estimators. The disclosure of the AFAMRL-TR-80-27 report is hereby also incorporated by reference into the present specification.

It is known in the art, therefore, to estimate the limiting resolution of military camera systems at the intersection of the modulation transfer function (MTF) curve, and the aerial image modulation (AIM) or modulation detectability curve. According to this practice the AIM curve may be subjectively derived from threshold data of photographically recorded three-bar groupings having decreasing bar width and made in accordance with military standard Mil. Std. 150A which is also hereby incorporated herein by reference. In this arrangement the three-bar groups resemble square waveforms, that is, waveforms having the appearance of a square wave, and the MTF curve is based on response to sine-wave patterns. It is, of course, also known that such square waveforms may be resolved into Fourier series components of a sinusoidal character. The use of square wave based waveforms for deriving the AIM curve has, however, been largely based on convenience and the absence of satisfactory equipment for generating accurate and controllabe sine wave patterns rather than on the theoretically desirable nature of such procedures.

The patent art discloses several inventions concerned with the measurement of optical resolution, and obtaining a modulation transfer function characterization of optical apparatus. Included in this art is the patent of H. T. Buschmann, U.S. Pat. No. 3,977,795, which concerns a method for determining the modulation transfer function. In the Buschmann patent a coherent, opticaly produced scatter of known noise distribution or known spatial frequency spectrum, is used in determining a modulation transfer function. The Buschmann invention determines only the real part of the modulation transfer function, the part used in assessing the quality of photographic films and papers, and teaches the use of optical energy of differing spectral content, i.e, different color, when required by the materials being assessed. The Buschmann invention employs an optical noise spectrum of wide but known frequency content for exciting the optical device under investigation and converts the optical noise signal output from the device into electrical signals which are subsequently examined for frequency and amplitude content; the results of the electrical signal examination are converted to MTF values through the use of two equations presented. The Buschmann apparatus is also compared with the use of sinusoidal test screens or sinusoidal gratings and found to provide increased speed and ease of determining the MTF. The disclosure of the Buschmann patent is also hereby incorporated by reference into the present specification.

The patent art additionally includes the invention of W. E. Flynt, in U.S. No. 4,060,328, which also concerns a system for measuring the modulation transfer function of an optical device. The Flynt apparatus employs a wide band excitation and converts the portion of this excitation transmitted by the unit under test to an electrical signal, a signal subsequently examined in a plurality of frequency segregated bands to determine the modulation transfer function. The Flynt apparatus is especially concerned with establishing an absolute 100% MTF reference level from which normalized MTF values can be based. In the Flynt invention, the low frequency component of the electrically converted optical signal is used as this 100% reference and the higher frequency components are determined as a percentage of this low frequency component signal. The low frequency component signal is based on a low optical spatial frequency, such as 0.75 line pairs per millimeter, and is presumed to be transmitted without attenuation by an image intensifier or other optical device under test and to be further processed without attenuation by a photomultiplier tube and electronic amplifier circuitry. The optical signal received at the photomultiplier tube of the Flynt invention is modulated by a device such as a motor-driven pattern wheel to provide at least one low frequency image component and one higher frequency image component for the photomultiplier. The disclosure of the Flynt patent is hereby also incorporated by reference into the present specification.

The patent art also includes U.S. Pat. No. 4,274,737, in the name of Bradford Howland, concerning test patterns for the evaluation of lenses. In the Howland patent, a lens test chart is fabricated from a plurality of different test patterns, including patterns having intensity variations that are periodic, sinusoidal, and of increasing spatial frequency. The Howland patent teaches against use of the modulation transfer function (except for noting that a lens response to a disclosed pattern approaches the MTF response) and does not consider the aerial image modulation or AIM curve. The Howland patent also teaches use of a three-dimensional chart having both linear and sinusoidal reflectance variations for use in the direct determination of modulation transfer function for a lens or optical component. The disclosure of the Howland patent is also hereby incorporated by reference into the present specification.

The patent art also includes U.S. Pat. No. 4,241,996 issued to one Sidney Weiser concerning an apparatus for measuring the quality of optical equipment through determining the modulation transfer function of the equipment. The Weiser apparatus is especially concerned with the measurement of modulation transfer function at low light levels where signal-to-noise ratio problems are expected and precise scanning is required. The Weiser invention teaches use of an optical pattern having bar elements of various spacings and each accompanied by a clock signal track. Ideally, the optical and electrical signals generated by the optical bar pattern are square wave in nature in the Weiser invention, however, under expected conditions of signal degradation by the device under test, rounded corner or sinusoidal appearing signals occur. The disclosure of the Weiser patent is also hereby incorporated by reference into the present specification.

SUMMARY OF THE INVENTION

An object of the present invention is to provide an improved arrangement for determining the limiting resolution of an aerial camera or other optical apparatus.

Another object of the invention is to provide a limiting resolution determination arrangement which is based entirely on the use of sinusoidal intensity modulated grating patterns.

Another object of the invention is to provide a limiting resolution determination arrangement which can use a variety of methods for obtaining the modulation transfer function component, together with an aerial image modulation curve determination based on sinusoidal intensity modulated gratings.

Another object of the invention is to provide a limiting resolution determining arrangement that includes consideration of both optical elements and retina or photographic film elements of the apparatus being characterized.

Another object of the invention is to provide an optical limiting resolution determining arrangement which is more objective and less subjective in nature than has heretofore been possible.

Another object of the invention is to provide an improved arrangement for determining optical limiting resolution through the use of accurate and easily reproduced digital computer generated sinusoidal intensity grating patterns.

Additional objects and features of the invention will be understood from the following description and the accompanying drawings.

These and other objects are achieved by a method for determining limiting resolution of an optical device comprising the steps of generating a modulation transfer function curve relating spatial frequency and modulation percentage in the optical device, forming a plurality of sinusoidal intensity modulated bar patterns of varied spatial frequency and intensity modulation percentage, recording the patterns of sinusoidal intensity modulated bars on photoresponsive media, determining from observations of the media recorded patterns using the optical device, the pattern modulation yielding a predetermined degree of visual resolution for each recorded spatial frequency pattern, establishing an image modulation curve function relating recorded bar pattern spatial frequency and determined modulation percentage values for the optical device, identifying the limiting resolution determining common point intercept of the modulation transfer curve function and the image modulation curve function with respect to values of modulation percentage and spatial frequency.

BRIEF DESCRIPTION OF THE DRAWINGS

FIG. 2 shows an array of sinusoidal intensity modulated bar patterns of the type usable in practicing the invention.

FIG. 3 shows additional details of the FIG. 2 bar pattern.

FIG. 4 shows an alternate arrangement for determining limiting resolution.

DETAILED DESCRIPTION

Figure 1:
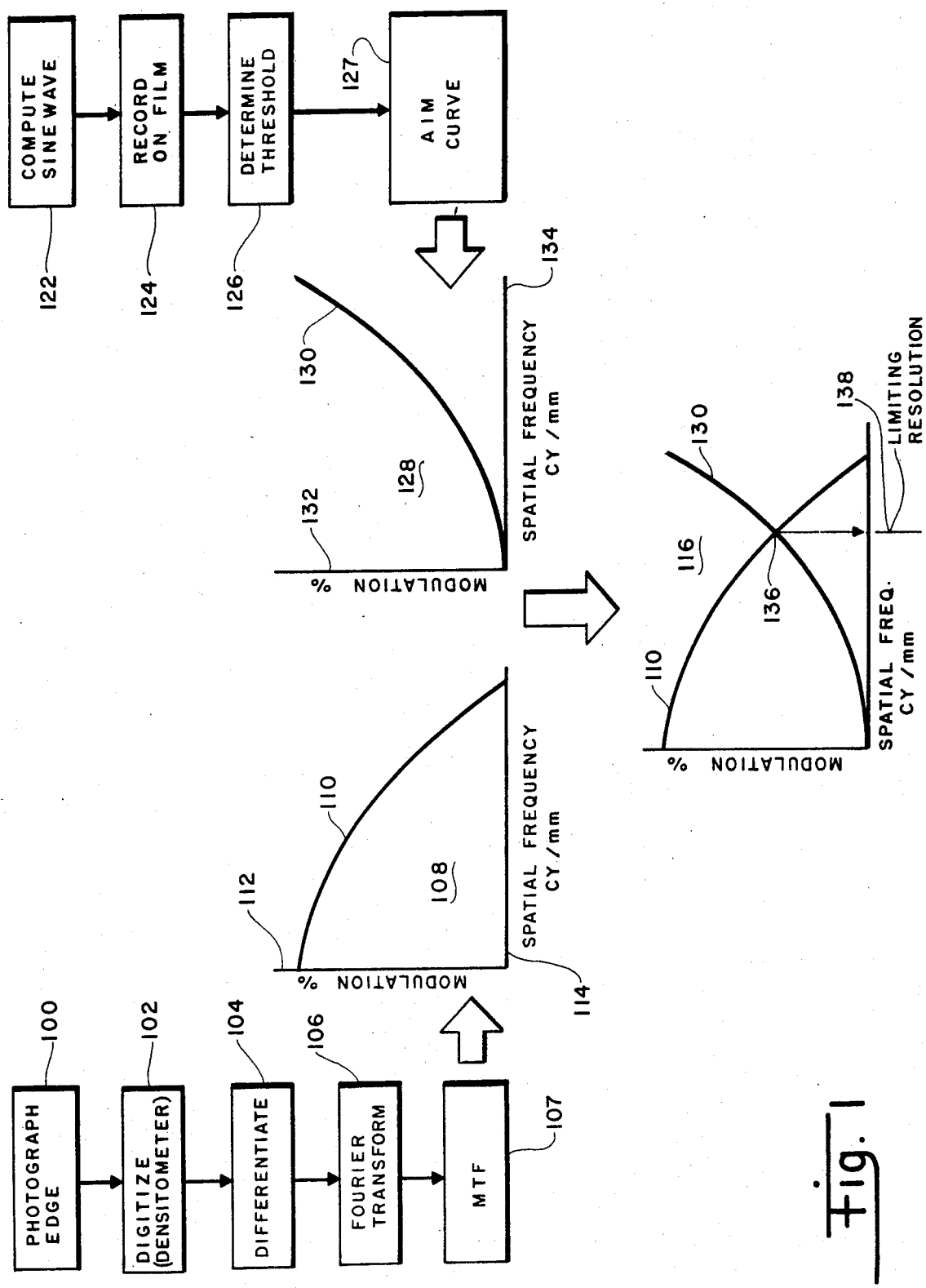
FIG. 1 shows a block diagram flow sequence for determining limiting resolution in accordance with the present invention.

Although the modulation transfer function (MTF) has gained wide acceptance in the evaluation of optical systems, it is recognized that standing alone, the modulation transfer function does not represent image quality, but is merely an operator that can be used with spatial frequency spectra to predict an accurate response of an optical system. Knowledge of optical system MTF is therefore not alone definitive of an optical response without knowledge of the Fourier spectra of the scene being imaged. Usually the Fourier spectra of scenes to be reproduced is so varied that statistical definitions or other imprecise arrangements are required for formal use of the MTF. Actually, a formal application of the MTF involves a showing as to how the system reduces modulation on sinusoidal inputs as a function of the spatial frequency of the input patterns in the image plane.

Considering then an improved arrangement involving the use of the MTF and AIM curves in determining optical system limiting resolution, in a graph of modulation transfer function the area below the curve represents combinations of spatial frequency and modulation percentage that are system resolvable. In the aerial image modulation transfer curve areas above the curve are discernible by trained human evaluators as useful image information while areas below the curve are not resolvable. The area between these two curves therefore represents system resolvable and human resolvable combinations of spatial frequency and modulation percentage and the upper frequency intersection of these two curves is a measure of limiting resolution for a tested system such as a camera and film.

The use of abrupt white-to-dark transition bar patterns for obtaining the aerial image modulation (AIM)

curve, limiting curve, or similar psycho-visual demand curve for an optical system is based on an underlying principle that is frequently used in connection with optics, electrical circuitry and other wave phenomena. According to this principle, square wave patterns can be resolved into the sinusoidal components of a Fourier series representation. With the application of this concept, therefore, a square wave of designated fundamental frequency is representable by or replaceable by a combination of sinusoidal components having the same fundamental frequency and a plurality of components of higher multiples of this fundamental frequency-with each component being of selected peak amplitude. This is similar to the electrical circuit concept wherein waveforms of irregular waveshape are represented by a fundamental frequency and selected amplitude multiples of the fundamental frequency for convenient electrical waveform and filter network analysis.

A problem arises with this method of analysis in the case of optical systems, however, in that the resolution of a square wave intensity pttern into the contemplated Fourier components by optical system elements does not always occur in accordance with desirable mathematical precision. Such resolution is instead often affected by the physical properties and imperfections of the optical system or lens under test, i.e, by the optical physics involved in a black and white bar to Fourier sinusoid component transformation. The subjective evaluation of image information necessary to produce an AIM curve is for this reason limited or unnecessarily biased in existing procedures—by the incorporated presence of an imprecise transformation of a bar pattern into sinusoidal components. The effect of this bias can be somewhat appreciated by realizing again that the AIM curve is based on the use of trained test subjects and relies essentially upon the ability of these subjects to discern the presence of modulation in a vague or weakly-defined pattern—a pattern varying in spatial frequency and having only shades of gray distinction to identify the presence of modulation. The AIM curve determining patterns are actually characterized by unfocused appearing shades of gray images, and are additionally complicated by lack of definition, and similar hard-to-define criteria. The addition of optical physics imperfection variables relating to the processing of bar pattern images in the already difficult AIM curve sinusoidal intensity pattern interpretation is therefore at least an unwelcome complication of the task the human AIM curve evaluators perform and realistically, also a major unknown in the evaluation results.

The present invention improves upon the use of bar patterns in obtaining the AIM curve by commencing with patterns already conforming to sinusoidal intensity modulation, that is, by commencing with sinusoidal intensity patterns rather than depending upon the system under test to generate sinusoidal patterns from, for example, a collection of black-to-white contrast bars and their Fourier transformation. A significant benefit from this arrangement, of course, resides in the inherent capability to commence the AIM curve determination with patterns of known character—patterns not tainted by physics imperfections in the optics under test.

Heretofore it has been impractical to use sinusoidal intensity modulated optical patterns for such purposes as AIM curve determination because of the absence in the art of a low-cost, flexible and reliable arrangement for generating these patterns. This shortcoming is largely overcome by the disclosure of my copending patent application, DYNAMIC BAR PATTERN APPARATUS AND METHOD, Ser. no. 556,861, filed Dec. 1, 1983 and issued May 27, 1986 as U.S. Pat. No. 4,591,988 in the names of myself, Gilbert G. Kuperman, and a co-inventor Donald L. Wallquist. The disclosure of this patent is hereby also incorporated by reference into the present document and is subsequently referred to herein as the December 1983 application. This Dec. 1983 application discloses an arrangement for generating accurate, flexible and fully computer-controlled sinusoidal bar patterns. In the present invention usage, the generated bar patterns can remain stationary in nature as opposed to the moving patterns espoused in the December 1983 application.

Although a cathode ray tube screen is disclosed as a principal vehicle for displaying the sinusoidal intensity modulated bar patterns in the December 1983 application, other transducer arrangements can be employed, including a deflected laser beam recording arrangement wherein pattern intensity on a film medium is related to the time the laser beam spends in a particular location. A deflected laser beam arrangement may be preferable to intensity modulation of the laser for such pattern generation since the Pockel's cells devices, used for laser modulation according to the present state of the art are known to be inherently of a a low-frequency or slow nature. Alternately, some other form of transducer for the sinusoidal intensity patterns generated in the December 1983 application may be employed, including a random dot pattern generator wherein intensity correlates with the occurrence frequency or density of a displayed dot pattern.

A sequence of steps for determining limiting resolution of an optical system using the sinusoidal bar patterns generated according to one of these arrangements is shown in FIG. 1 of the drawings. In FIG. 1, the steps on the page left-hand side are concerned with determining the MTF component of limiting resolution while the steps on the page's right-hand side are concerned with determining the AIM curve component of limiting resolution.

The MTF determining sequence includes the four steps indicated in the blocks 100, 102, 104, and 106. The achieved MTF information may be resident in a numerical array of data or alternately, may be conveyed graphically as indicated at 108 in FIG. 1—including the curve 110 drawn on coordinate axes of modulation percentage 112 and spatial frequency 114 in cycles per millimeter, for example. The FIG. 1 sequence of steps relates to a determination of MTF by the use of a Heaviside edge function—a photographic target scene containing an abrupt contrast transfer, such as a transfer from white to black. Target scenes of this type can, of course, be arranged with large panels of colored canvas, painted concrete, or other large area arrangements in the case of evaluating an aerial camera system and can be arranged with a variety of materials in the case of smaller laboratory tested apparatus.

The edge function captured from the target scene by the optical apparatus under test in the block 100 is recorded on film or other recording arrangements known in the art, and is subjected to film developing according to the process comprising a part of the system under test. The resulting film image is analyzed in detail by a densitometer or microdensitometer instrument, as indicated in the block 102 in FIG. 1. A microdensitometer is used where the smaller spot or slit aperture size in the range of a micron is appropriate. The term densitometer is used generically herein for either the densitometer or microdensitometer instrument. The output of the densitometer scanning is a sequence of signals representing a ramp function, the appearance of the Heaviside target scene image after transmittance through the optical system under test and scanning in a series of small aperture densitometer samples.

Reproduction of the Heaviside target by the optical system under test may be first converted from a density image as is customarily found in a photographic negative to a transmittance image and from a transmittance image to an exposure image between the blocks 100 and 102 in FIG. 1 in order that the digitizing step be accomplished in exposure space—as is sometimes preferable in sequences of the FIG. 1 type. Density in the optical sense is related to transmittance according to the mathematical relationship $$\text{Density} = \log 1/\text{transmittance}.$$

Transmittance and exposure are, according to optical theory, related by the standard procedure of measuring and graphically depicting density as a function of exposure (where exposure is measured in meter-candle-seconds) and then computing transmittance.

The series of array of samples data provided by the densitometer in FIG. 1 is subjected to mathematical differentiation, preferably using a digital computer as is indicated in the block 104. The mathematical derivative of the densitometer analyzed Heaviside edge function can be shown to represent the line spread function of the optical system under evaluation.

The Fourier transform of the line spread function, that is, the real part of the Fourier transform, is defined to be the modulation transfer function, MTF, for the optical system under test. Fourier transformation is indicated in the block 106 in FIG. 1, and may be accomplished according to the well-known Couley Tukey algorithm described in the publication, "An Algorithm for the Machine Computation of Complex Fourier Series" *Mathematics of Computers*, Vol. 19, 1965, by J. W. Couley and J. W. Tukey. The disclosure of the Couley-Tukey article is also hereby incorporated by reference into the present specification. Other Fourier transformation algorithms may, of course, be employed in accomplishing the block 106 discrete Fourer transformation.

The MTF may be considered to exist in mathematical form in the block 107, and in graphic form at 108 in FIG. 1. The curve 110 in the graphic representation 108, again, represents the objective limit of transmission capability of the optical system under test, with points below the curve 110 indicating modulation percentages and spatial frequencies within the capability of the optical system. The MTF of the lens or optical system alone can be estimated by dividing the determined system MTF by the MTF of the film and processing at each spatial frequency.

A sequence of steps for determining a psychovisual describing function such as the AIM curve, (i.e., the above-described demand curve or human requirement curve representing the ability of human subjects to detect information in images processed by the optical system under test) can be achieved according to the steps of blocks 122, 124, and 126 in the right-most portion of FIG. 1. The computation and physical representation of sinusoidal bar patterns as indicated in the block 122 in FIG. 1 can be accomplished according to arrangements disclosed in the Dec. 1983 patent application or according to other arrangements known to persons skilled in the optics art.

The AIM curve, as determined in this right-hand series of steps in FIG. 1, is based on the premise that increasing spatial frequency is usually accompanied by a demand for increased modulation percentage on the part of a human observer in order to detect the presence of modulation in an image. The AIM curve is based on the detection of modulation according to predetermined criteria by one or more human subjects trained in the criteria to be used. This detection of modulation by trained human subjects is indicated by the block 126 in FIG. 1, and is generally performed on a 50% surety basis wherein, for example, at least half of a panel of experts agrees in each determination of modulation presence or alternately, a given expert reports the presence of modulation one-half of the time. Modulation in the evaluated images can be defined as $(T_{max} - T_{min})/(T_{max} + T_{min})$ where $T_{max}$ is the maximum transmittance and $T_{min}$ is the minimum transmittance through the sinusoid density bar patterns.

The image being evaluated in the steps 122, 124, and 126 is in the form of a homogeneous gray field of some average density with the performed evaluation seeking to identify the presence of modulation bars in this gray field. The criteria for detecting modulation presence with regard to whether modulation is required over at least one-half of a particular bar length, or in one-half of the homogeneous gray field area, can be agreed upon at the outset of a trained subject effort. The image field presented to the trained human subjects, however, has a general appearance of a gray uniform field, which on close examination is found to include blurred, defocused, or more appropriately, soft imaged lines which comprise the modulation to be detected by the test subjects. Preferably, the image being evaluated is of sufficient size as to negate the presence of end effects which would tend to make modulation in a bar pattern field more easily discerned.

The AIM curve data is represented by the block 127 in FIG. 1 and comprises an array of numbers representing different spatial frequencies for the sine-wave bar patterns generated in the blocks 122 and 124, and a modulation percentage required at each spatial frequency in order for the panel of experts to agree, per criteria, as to the presence of modulation at each spatial frequency value. In graphic form, this data appears as shown at 128 in FIG. 1, and includes a curve 130 plotted on the axes of modulation percentage 132, and spatial frequency 134. Information defined by the values on and above the curve 130 in FIG. 1 represent modulation percentage and spatial frequency combinations which are discernible or usable by human test subjects, while values below the curve 130 are not useful to a human— even if information is present in such values.

The AIM curve determined in FIG. 1 is based on the use of the same film and film processing as employed in the sequence of steps 100–107 in FIG. 1, the same film and processing as are being evaluated in the overall FIG. 1 limiting resolution determination. This arrangement, of course, incorporates the film and film noise, film thresholds, and conceivably even image motion, and other image characteristics into an overall determination of resolution.

A graphical determination of the limiting resolution value, as indicated at 116 in FIG. 1, involves arrangement of the data from the blocks 107 and 127 on common scales of modulation percentage and spatial frequency in order that the intercept 136 of the curves 110 and 130 and the limiting resolution value 138 be located geometrically. The intercept limiting resolution value 138 is, of course, the sought-after characteristic of the optical apparatus, film, film processing, and other variables incorporated into the system under test.

A sinusoidal intensity modulated bar pattern image suitable for use in the FIG. 1 AIM curve determination sequence and also for use in MTF curve determinations is shown in FIG. 2 of the drawings. The FIG. 2 bar pattern image may be recorded, for example, on a 4×5 inch film plate or substrate 200 for use in determining the AIM curve according to the FIG. steps of blocks 122-127. The bar pattern arrangement in FIG. 2 may be achieved according to the steps of blocks 122 and 124 in FIG. 1, and the greater detail recited in the December 1983 incorporated-by-reference patent application. In the December 1983 application, the generated bar patterns are shown to be moving, of varying frequencies, and of multiple frequencies within the same pattern display; for use in the present inventions, such embellishments are, of course, not required. Generally a sinusoidally varying relative intensity pattern is provided in accordance with the December 1983 application by assigning an intensity value (in the 0 to 255 range according to the preferred arrangement of the December 1983 application) to each value of the sampled sinusoid (i.e., in correspondence with the normalized −1 to +1 range of a sinusoid). These 0 to 255 range values can then be linearized through a table lookup procedure to produce sinusoidal transmittance variations on the recording film—with the film processing effects considered. A high-resolution film recorder such as a laser recorder with a 1 micron writing spot may be used. Patterns intended for use with the present invention therefore represent an easily accomplished task for the apparatus and method disclosed in the December 1983 application.

The width of an individual bar, 202 in the FIG. 2 pattern arrangement is indicated at 206; the space between bars (204) is indicated at 208. As may be appreciated by persons skilled in the art and knowledgeable of sine wave properties, the widths 206 and 208 are in actuality equal in size, although in consideration of drawing convenience and drawing threshold considerations they may appear unequal in FIG. 2. The number of sinusoid cycles and the number of bars and spaces employed in the FIG. 2 patterns and used in the FIG. 1 steps are, of course, varied from a few large appearing bars to a great number of smaller appearing bars as required for the spatial frequency under consideration. Preferably, at least three complete sinusoidal density cycles are present at each modulation and spatial frequency.

The determination of modulation transfer function (MTF) by a direct sinusoid pattern arrangement rather than by the described-above Heaviside edge image arrangement is also feasible as an alternate arrangement of the present invention and is described below herein. As a practical consideration, however, it is to be noted that in this direct determination of MTF arrangement a large number of sinusoidal bar patterns of varying spatial frequency are needed and that the use of a Heaviside edge function as described above is therefore more convenient.

FIG. 3 herein is similar to FIG. 1D in the incorporated-by-reference December 1983 patent application, and serves to indicate the large range of image density desired in the bars 202 in FIG. 2. As indicated in the December 1983 application, apparatus providing a total of 256 different density variations is readily achieved in the electronic art. The pixels 300, 302 and 304 in FIG. 3 represent image portions tending toward the darker end of this range, while the pixels 308, 310 and 312 lie at the lighter end of this density range and the dotted line 306 indicates the presence of additional graduated density pixels in the central portion of the density range. The fractional pixels 300 and 312 also indicate the presence of pixels of darker and lighter density at the ends of the FIG. 3 representation to achieve the total of 256 different density values in the preferred arrangement.

Sinusoidal intensity modulated bar patterns of the type shown in FIG. 2 may, as indicated, also be used in determining the modulation transfer function as an alternate to the Heaviside edge function arrangement shown in FIG. 1. Determination of the MTF through the use of sinusoid patterns is shown in the sequence of steps represented by the blocks 400, 402, 404, 406 and 408 in FIG. 4. The FIG. 4 sequence of steps if based on the concept that the modulation transfer function at a given frequency represents the mathematical ratio of the modulation percentage existing in a set of system output patterns divided by the modulation percentage existing in a set of system input patterns. This ratio of output to input modulation percentages is also often expressed as the ratio of modulation amplitude out divided by modulation amplitude in, where amplitudes are measured formally in meter candle seconds, for example.

The FIG. 4 MTF determination sequence contemplates the existence of sinusoid bar patterns of varying spatial frequency and known modulation percentage in the block 400 and the transmission of these bar patterns through the optical system under test in the block 402. The output images from the optical system under test may be recorded as shown in the block 404 in FIG. 4, and the modulation percentages existing in the output bar patterns measured as indicated in the block 406. The computation of output modulation percentage to input modulation percentage at each spatial frequency is computed preferably with computer assistance as indicated in the block 408. The curve 410 in FIG. 4 represents the MTF determination in accordance with the blocks 400-408 and is obtained by plotting the output divided by input value for a number of spatial frequencies.

The FIG. 4 arrangement for determining MTF offers the advantage of employing sine wave intensity modulated patterns of known purity and of even greater compatibility with the sequence of steps used for determining the AIM curve in FIG. 1. The FIG. 4 sequence requires the use of a large number of varying spatial frequency patterns, and is therefore somewhat more cumbersome than is the sequence shown in the blocks 100-107 in FIG. 1—especially if aerially viewed images are under consideration. The simplicity of a light-to-dark Heaviside contrast pattern is the ultimate in pattern convenience, but requires the differentiation and Fourier transform steps of blocks 104 and 106. These block 104 and 106 mathematical steps can, of course, be accomplished within a computer and are therefore amenable to easy and low-cost processing. The FIG. 4 MTF determination arrangement is also improved as to signal-to-noise characteristics, since the involved sinusoidal bar patterns are pure sinusoids of intensity and do not involve the system transmission and distortion of small value fractional coefficients in a Fourier image decomposition.

The determination of limiting resolution by the arrangements disclosed herein have involved the use of sinusoidal intensity modulated bar patterns as the optical stimuli for the apparatus under test. The use of sinusoidal intensity bar patterns, especially for determining the AIM curve, offers the advantage of avoiding effects beyond those predicted by the customary mathematical analysis of a pattern decomposition into Fourier components. The usual mathematical approach to bar pattern image processing assumes a mathematically predictable decomposition of, for example, a black and white bar pattern into Fourier component harmonics of varying but generally small peak amplitudes—a concept not always supported by the physical processes occurring within the optical system. In truth, the Fourier components actually produced by an optical system are found to be distorted by such effects as non-linearities in the silver halide photographic film grains, edge effects and other real-world departures from mathematically predicted behavior.

The presently-disclosed limiting resolution arrangement in contrast, by employing sinusoidally varying intensity patterns as the optical input stimulus avoids the complexities of highfrequency and harmonic inputs to a real-world optical system, and does not assume the presence of an ideal decomposition in explaining the physical results of processing in the optical system. In the presently-disclosed arrangement, the totality of the optical energy is received at the indicated fundamental frequency and boundary problems involving edges and high-frequency components are therefore avoided.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. A method for determining limiting resolution of an optical device comprising the steps of:
   generating a modulation transfer function curve relating spatial frequency and modulation percentage for said optical device;
   forming a plurality of sinusoidal intensity modulated bar patterns of varied spatial frequency and intensity modulation percentage;
   recording said patterns of sinusoidal intensity modulated bars on photo-responsive media;
   determining from subjective observations of said media recorded patterns using said optical device, the pattern modulation percentage yielding a predetermined degree of visual resolution for each recorded spatial frequency pattern;
   establishing an image modulation curve function relating recorded bar pattern spatial frequency and determined modulation percentage values for said optical device; and
   identifying the limiting resolution determining common point intercept of said modulation transfer function curve and said image modulation curve function with respect to values of modulation percentage and spatial frequency.

2. The method of claim 1 wherein said modulation transfer function curve generation also includes using sinusoidal intensity modulated patterns;
   whereby both said modulation transfer curve function and said image modulation curve function are derived from compatible sinusoidal intensity modulated image patterns.

3. The method of claim 1 wherein said predetermined degree of visual resolution is fifty percent.

4. The method of claim 3 wherein said fifty-percent value is determined from the quotient of the difference between maximum and minimum optical transmittance values divided by the summation of maximum and minimum transmittance values in said spatial frequency pattern.

5. The method of claim 4 wherein said media recorded pattern includes three complete cycles of sinusoidal intensity variation.

6. The method of claim 1 wherein said recording of said patterns includes the use of an intensity modulated laser.

7. The method of claim 1 wherein said determining from subjective observations includes observations by a plurality of human observers.

8. The method of claim 1 wherein said modulation transfer function curve and said image modulation curve function are stored as arrays of mathematical values.

9. The method of claim 8 wherein said identifying of curve function common point intercept comprises a sequence of mathematical steps performed in a digital computer.

10. The method of claim 1 wherein said modulation transfer function curve and said image modulation curve function are plotted as graphical relationships and said identifying of the common point is accomplished graphically.

11. The method of claim 1 wherein said forming of sinusoidal intensity modulated bar patterns includes the use of digital values and manipulating of digital values in a digital computer.

12. The method of claim 1 wherein said step of generating a modulation transfer curve function includes exposing a Heaviside function edge through said optical device.

13. A method for determining a threshold function for an optical device comprising the steps of:
   forming an image having a plurality of sinusoidal intensity modulated bar patterns of predetermined varied spatial frequency and intensity modulation percentage;
   recording said image of sinusoidal intensity modulated bar patterns on photo-responsive media;
   determining from trained subjective observations of said media recorded bar patterns, accomplished with said optical device, the pattern modulation percentage yielding predetermined degrees of visual resolution for each recorded spatial frequency pattern; and
   recording the determined modulation percentage values and related bar pattern spatial frequencies as said threshold function.

14. The method of claim 13 wherein said threshold function is an aerial image modulation curve and said optical device is an aerial optical retina apparatus.

15. The method of claim 13 wherein said recording step includes graphic plotting of said spatial frequency and modulation percentage data.

* * * * *